(12) United States Patent
Kaushik et al.

(10) Patent No.: US 10,353,636 B2
(45) Date of Patent: Jul. 16, 2019

(54) WRITE FILTER WITH DYNAMICALLY EXPANDABLE OVERLAY

(71) Applicant: Wyse Technology L.L.C., Santa Clara, CA (US)

(72) Inventors: Puneet Kaushik, Fremont, CA (US); Salil S Joshi, Fremont, CA (US); Sumit Popli, Campbell, CA (US)

(73) Assignee: WYSE TECHNOLOGY L.L.C., Santa Clara, CA (US)

( * ) Notice: Subject to any disclaimer, the term of this patent is extended or adjusted under 35 U.S.C. 154(b) by 0 days.

(21) Appl. No.: 15/424,977

(22) Filed: Feb. 6, 2017

(65) Prior Publication Data
US 2018/0225058 A1 Aug. 9, 2018

(51) Int. Cl.
*G06F 3/06* (2006.01)
*G06F 12/06* (2006.01)

(52) U.S. Cl.
CPC .......... *G06F 3/0673* (2013.01); *G06F 3/0617* (2013.01); *G06F 3/0659* (2013.01); *G06F 12/0638* (2013.01); *G06F 2212/1024* (2013.01); *G06F 2212/1044* (2013.01); *G06F 2212/1048* (2013.01)

(58) Field of Classification Search
CPC .... G06F 3/0673; G06F 3/0653; G06F 3/0647; G06F 3/0604; G06F 3/0644
See application file for complete search history.

(56) References Cited

U.S. PATENT DOCUMENTS

| 2003/0196031 | A1* | 10/2003 | Chen | G06F 12/0873 711/104 |
| 2007/0186070 | A1* | 8/2007 | Federa | G06F 12/1425 711/163 |
| 2013/0114354 | A1* | 5/2013 | Ryu | G11C 11/5628 365/189.011 |
| 2015/0067390 | A1* | 3/2015 | Blake | G06F 9/45558 714/15 |

* cited by examiner

*Primary Examiner* — Larry T Mackall
(74) *Attorney, Agent, or Firm* — Kirton McConkie; Brian Tucker

(57) ABSTRACT

A write filter can be configured to employ a dynamically expandable overlay. The size of the overlay could initially be small and could then grow and shrink during the current session based on demand. The overlay can span both RAM and disk to thereby allow the size of the overlay to be relatively large. When sufficient RAM is available, the overlay can be allowed to grow in RAM. In contrast, if RAM is low, the overlay can grow on disk. Also, artifacts in the overlay can be moved from the RAM portion to the disk portion to reduce the amount of RAM consumed by the overlay. Because the overlay is dynamically expandable, it will typically not become full and will therefore not force a reboot.

20 Claims, 15 Drawing Sheets

WRITE FILTER WITH DYNAMICALLY EXPANDABLE OVERLAY

CROSS-REFERENCE TO RELATED APPLICATIONS

N/A

BACKGROUND

The Windows Embedded operating system includes functionality that can prevent the content of a storage medium from being changed. In a typical example, it may be desirable to prevent the operating system image, which may be stored on a particular disk partition or on flash media, from being changed at runtime. To accomplish this, Windows Embedded provides a file-based write filter which operates at the file level and an enhanced write filter (or sector-based write filter) that operates at the sector level to redirect all writes that target a protected volume to a RAM or disk cache called an overlay. This overlay stores changes made to the operating system at runtime but is removed when the device is restarted thereby restoring the device to its original state.

FIG. 1 illustrates how a file-based write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, file-based write filter 110 is positioned at the top of the driver stack and will therefore be able to process an IRP prior to the IRP being passed down to the lower level drivers. It is noted that the architecture would be similar when a sector-based write filter is employed except that the sector-based write filter would sit below file system driver 111. File-based write filter 110 (or equally a sector-based write filter) can be configured to detect writes targeting a protected volume and redirect them to overlay 140 rather than allowing them to be passed down the driver stack. As a result, the write will actually occur in overlay 140 rather than to disk 100. File-based write filter 110 can be further configured to detect reads that target content that has been stored in overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

The size of the overlay employed by the Windows file-based write filter is static and cannot be changed without first rebooting the system. In particular, the FbwfSetCacheThreshold function allows the size of the overlay, in megabytes, to be specified. However, when this function is called, it has no effect on the size of the overlay during the current session. Instead, the specified size of the overlay will not be applied until the next reboot. By default, the size of the overlay will be 64 megabytes and can be increased up to the value of FBWF_MAX_CACHE_THRESHOLD.

One problem that results from the static size of the overlay is that the system will be automatically rebooted if the overlay becomes full. The user will not be presented with an option to reboot in this scenario. Over time, even if the size of the overlay is set to FB_WF_MAX_CACHE_THRESHOLD, it is likely to become full and force the reboot of the system. As a result, the user experience can be greatly degraded when a file-based write filter is employed. Also, if the size of the overlay is set too high, the system may not have enough RAM left to run multiple applications or even the operating system.

BRIEF SUMMARY

The present invention extends to methods, systems, and computer program products for providing a write filter with a dynamically expandable overlay. The size of the overlay can initially be small and can then grow and shrink during the current session based on demand. The overlay can span both RAM and disk to thereby allow the size of the overlay to be relatively large. When sufficient RAM is available, the overlay can be allowed to grow in RAM. In contrast, if RAM is low, the overlay can grow on disk. Also, artifacts in the overlay can be moved from the RAM portion to the disk portion to reduce the amount of RAM consumed by the overlay. In some cases, the write filter can be configured to maintain more frequently used artifacts in the RAM portion of the overlay and less frequently used artifacts in the disk portion of the overlay thereby increasing the speed of accessing the frequently used artifacts. Because the overlay is dynamically expandable, it will typically not become full and will therefore not require a reboot.

In one embodiment, the present invention is implemented by a write filter as a method for providing a dynamically expandable overlay. The write filter can receive an I/O request that modifies an artifact on a protected volume. The write filter can then determine that an overlay used to store modified artifacts should be expanded. The write filter can expand the overlay and store the modified artifact in the overlay.

In another embodiment, the present invention is implemented as computer storage media storing computer-executable instructions which when executed implement a write filter that is configured to: intercept I/O requests targeting artifacts on a protected volume; redirect I/O requests that modify artifacts to an overlay; and dynamically modify a size of the overlay.

In another embodiment, the present invention is implemented as a method for expanding an overlay. A write filter can maintain a RAM overlay portion in which modified portions of artifacts are stored. The write filter receives an I/O request that modifies a portion of a first artifact. The write filter can also determine that a size of the overlay should be expanded. In response, the write filter can redirect the I/O request to a disk overlay portion such that the modified portion of the first artifact is stored in the disk overlay portion rather than the RAM overlay portion.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "artifact" should be construed as encompassing files, directories, or any other structure of a file system that can be modified via an I/O request. A "protected volume" should be construed as a volume storing artifacts that a write filter protects from modification.

Figure 1:
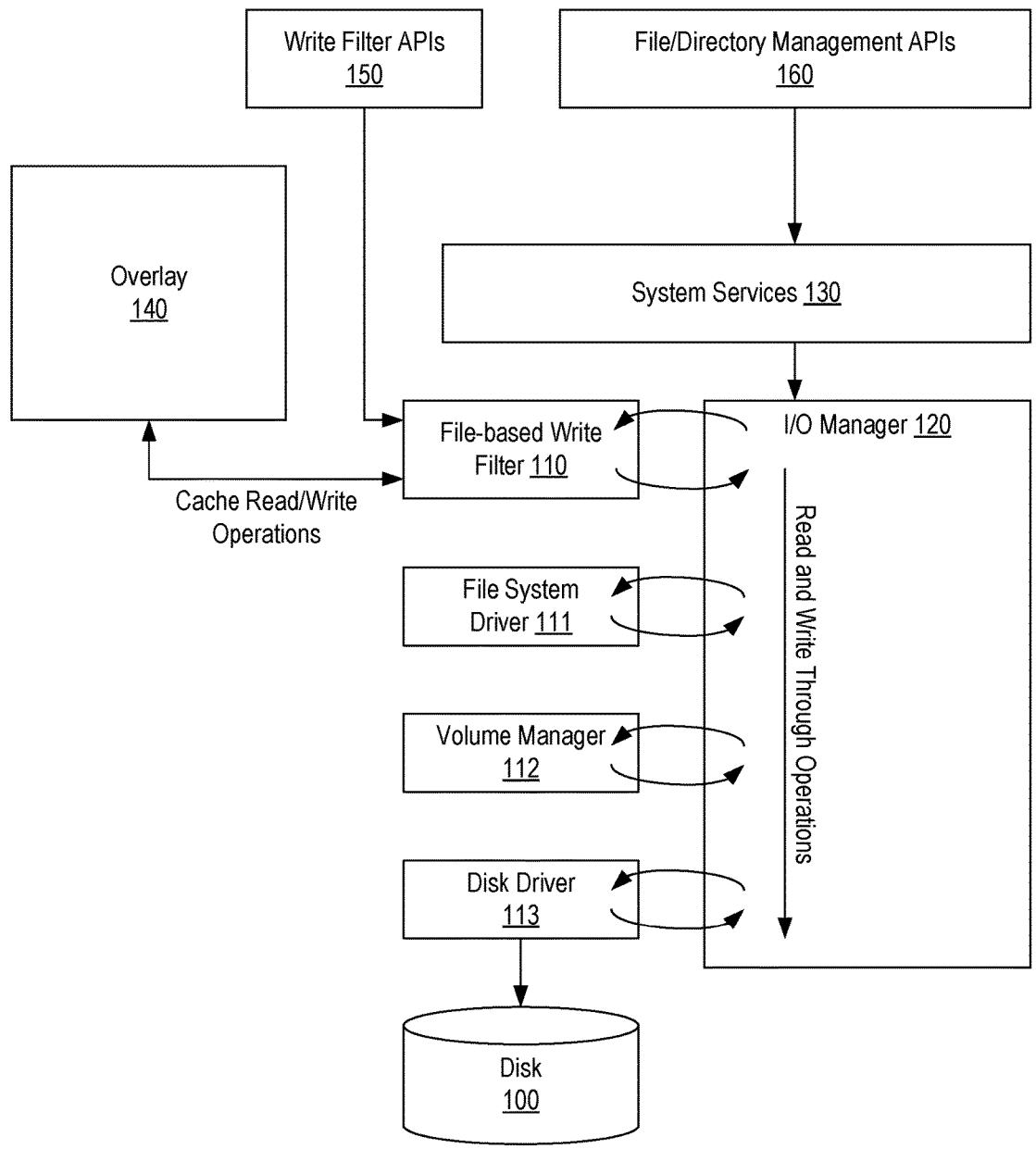
FIG. 1 illustrates a Windows-based I/O system in which a file-based write filter is employed to redirect writes targeting a protected volume to an overlay.
Figure 2:
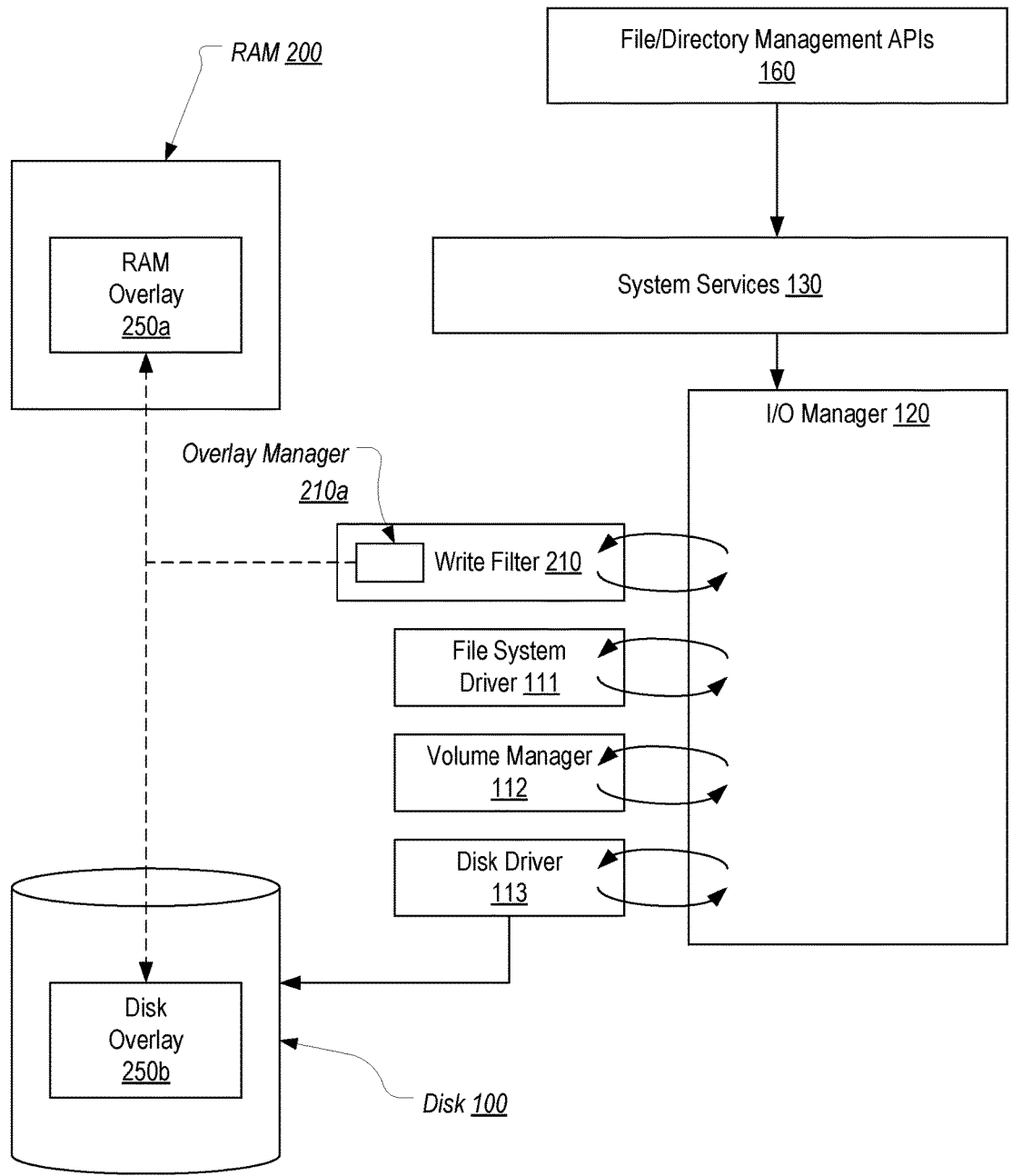
FIG. 2 illustrates a write filter that can provide a dynamically expandable overlay in accordance with embodiments of the present invention.

FIG. 2 illustrates how a write filter 210 can provide a dynamically expandable overlay in accordance with embodiments of the present invention. Write filter 210 can function as a filter driver that sits above file system driver 111 similar to file-based write filter 110 in FIG. 1. In other words, write filter 210 can be used in place of file-based write filter 110 (e.g., by disabling the Windows-provided File-based Write Filter). As a filter driver, write filter 210 can receive I/O requests (or IRPs) from I/O manager that target artifacts on a protected volume of disk 100 (or any other storage medium) and redirect them to an overlay (as represented by the dashed arrows) to prevent the artifacts on the protected volume from being modified.

Unlike file-based write filter 110, write filter 210 can include an overlay manager 210a for managing an overlay that can span multiple storage mediums. In particular, the overlay can include a portion that is maintained in RAM and one or more other portions that are maintained in other storage media such as on disk, in cloud storage, on a network share, etc. In the remainder of the description as well as in the claims, a "disk portion" or "disk overlay portion" should be construed as a portion of an overlay that is not stored in RAM but is instead stored on disk or in any other type of storage media that may be available on/to the computing device.

To simplify the description of the present invention, write filter 210 in general will be described as performing the overlay managing functionality. In actual implementations, the components of write filter 210 that implement a filter driver may be separate from overlay manager 210a and may communicate with overlay manager 210a using an API. However, such details are implementation specific and are not essential to the present invention.

FIG. 2 provides an example where the overlay is divided into a RAM overlay portion 250a in RAM 200 and a disk overlay portion 250b on disk 100. For purposes of this example, it will be assumed that disk overlay portion 250b is part of the protected volume on disk 100. However, disk overlay portion 250b could equally be on a separate (e.g., non-protected) volume on disk 100, on another disk, or on any other storage medium. If disk overlay portion 250b is stored on the protected volume, an appropriate exception can be added to write filter 210 so that it will allow artifacts to be stored in the disk overlay portion. In some embodiments, RAM overlay portion 250a can be structured as a RAM disk (i.e., as a logical storage volume in RAM 200) so that it can be treated as if it were a disk. However, other storage techniques could equally be employed to implement a RAM portion of an overlay.

By splitting the overlay into a RAM portion and one or more disk portions, write filter 210 can allow the overlay to grow as necessary to accommodate usage without the risk of the overlay becoming full. For example, if there are sufficient RAM resources, write filter 210 can allow the size of RAM overlay portion 250a to expand (e.g., by redirecting I/O requests to RAM overlay portion 250a rather than to disk overlay portion 250b). However, if RAM resources are running low, write filter 210 can redirect I/O requests to disk overlay portion 250b and/or move artifacts in RAM overlay portion 250a to disk overlay portion 250b. Accordingly, write filter 210 can include functionality for monitoring system resources such as RAM utilization to determine if and when to redirect I/O requests to disk overlay portion 250b.

Figure 3:
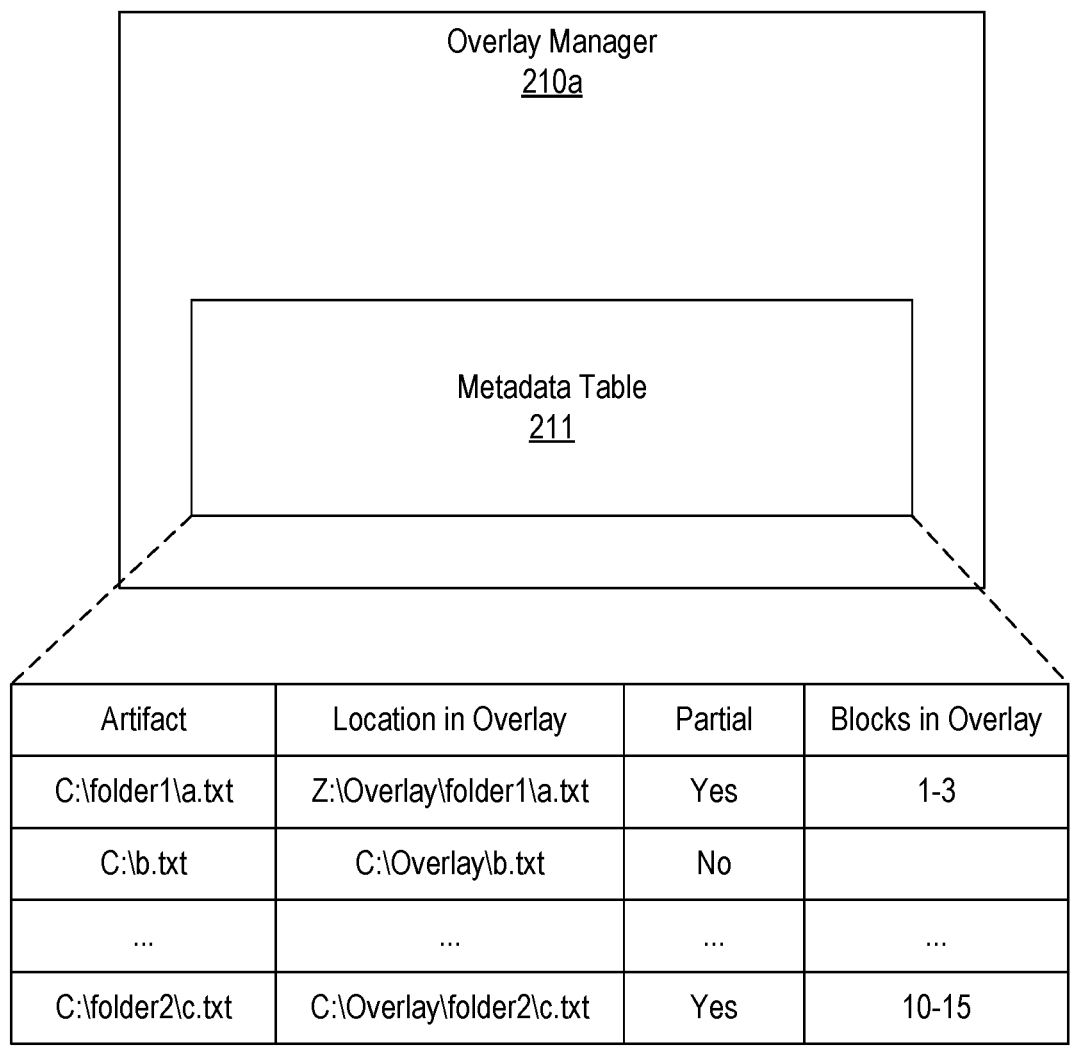
FIG. 3 provides an example of a metadata table that a write filter can maintain to track where modified portions of artifacts are stored in a dynamically expandable overlay.

To enable write filter 210 to properly redirect I/O requests targeting artifacts that have been stored in the overlay, overlay manager 210a can maintain a metadata table 211, an example of which is shown in FIG. 3. Metadata table 211 can include entries which define artifacts that have been stored in the overlay, where in the overlay these artifacts have been stored, and, in some embodiments, whether the entirety of an artifact is stored in the identified overlay location and, if not, which portions (e.g., blocks) of the artifact are stored at the particular location. It is noted that, in most cases, an I/O request will only modify a portion of an artifact. Write filter 210 can be configured to cause just the modified portions to be stored in the overlay.

In FIG. 3, metadata table 211 includes an "Artifact" column that identifies each artifact that is currently stored in the overlay. As described above, due to write filter 210, an artifact will be stored in the overlay when an attempt is made to modify the artifact so that the modified artifact is stored in the overlay while the version of the artifact on the protected volume remains unchanged. To give the appearance that the artifact was modified on the protected volume, subsequent requests to access the artifact will be redirected to the overlay rather than being sent to the protected volume (at least to retrieve the modified portions).

To allow write filter 210 to perform this redirection, metadata table 211 includes a "Location in Overlay" column which defines where in the overlay the corresponding artifact is stored. For purposes of this example, it will be assumed that C:\ is the protected volume, that the Z:\ drive represents a RAM disk that stores RAM overlay portion 250a, and that the C:\Overlay folder is a folder on the protected volume where disk overlay portion 250b is stored. Therefore, metadata table 211 indicates that an artifact, C:\folder1\a.txt, has been stored in the overlay at Z:\Overlay\folder1\a.txt (i.e., in RAM overlay portion 250a), an artifact, C:\b.txt, has been stored in the overlay at C:\Overlay\b.txt (i.e., in disk overlay portion 250b), and an artifact, C:\folder2\c.txt, has been stored in the overlay at C:\Overlay\folder2\c.txt.

As indicated above, write filter 210 can be configured to only store the modified portions of an artifact in the overlay.

For example, an I/O write request may include only the updated blocks of an artifact. Rather than storing the entire artifact in the overlay, write filter 210 can store only the modified blocks of the artifact (e.g., only the blocks that are included in an IRP that writes to an artifact). To track which blocks (or portions) of an artifact are stored in the overlay, metadata table 211 may also include a "Blocks in Overlay" column which identifies which blocks of the corresponding artifact are stored at the identified overlay location. For example, metadata table 211 indicates that only blocks 1-3 of C:\folder1\a.txt are stored at Z:\Overlay\folder1\a.txt and that only blocks 10-15 of C:\folder2\c.txt are stored at C:\Overlay\folder2\c.txt. Metadata table 211 is shown as including a "Partial" column which provides a quick indication of whether the entirety of the artifact is stored at the identified overlay location. The table format of metadata table 211 is intended to provide an easily visualized example of how write filter 210 may track artifacts that are stored in the overlay and any other suitable data structure could be used.

Although not shown in FIG. 3, in some embodiments, portions of an artifact may be stored at different locations of the overlay. For example, it is possible that write filter 210 could redirect a request to modify blocks 4-6 of C:\folder1\a.txt to disk overlay portion 250*b*. In such a case, metadata table 211 would be updated to include an entry that defines that blocks 4-6 of C:\folder1\a.txt are stored on disk overlay portion 250*b* (e.g., at C:\Overlay\folder1\a.txt). The splitting of portions of an artifact between different overlay portions could be performed for any reason such as, for example, when one portion of the artifact is accessed more frequently than other portions of the artifact as will be described in more detail below.

It is noted that when only portions of an artifact are stored in the overlay, it will be necessary to retrieve the unmodified portions of the artifact from the protected volume if a request to access the artifact encompasses the unmodified portions. For example, if a request to read all of C:\folder1\a.txt is received, write filter 210 can redirect a read request to Z:\Overlay\folder1\a.txt to retrieve blocks 1-3 of the artifact and can direct (or pass through) the read request to C:\folder1\a.txt to retrieve the unchanged portions of the artifact from the protected volume. In such a case, write filter 210 would piece together the results of the two read requests and create the artifact with the modified blocks 1-3 that would then be returned to the requesting application. Accordingly, from the perspective of the requesting application, it will appear as if the modified file had existed on and been retrieved from the protected volume.

A more detailed example of how write filter 210 can employ a dynamically expandable overlay will now be provided with reference to FIGS. 4A-4H. For ease of illustration, many of the components shown in FIG. 2 are not included in these figures. However, it can be assumed that the depicted steps are performed in a computing environment similar to what is shown in FIG. 2. Importantly, as noted above, no distinction will be made between overlay manager 210*a* and write filter 210. For purposes of this example, it will be assumed that the overlay is initially empty (which may be the case right after a reboot). In other words, both RAM overlay portion 250*a* and disk overlay portion 250*b* initially do not contain any artifacts. Therefore metadata table 211 will also initially be empty.

Figure 4A:
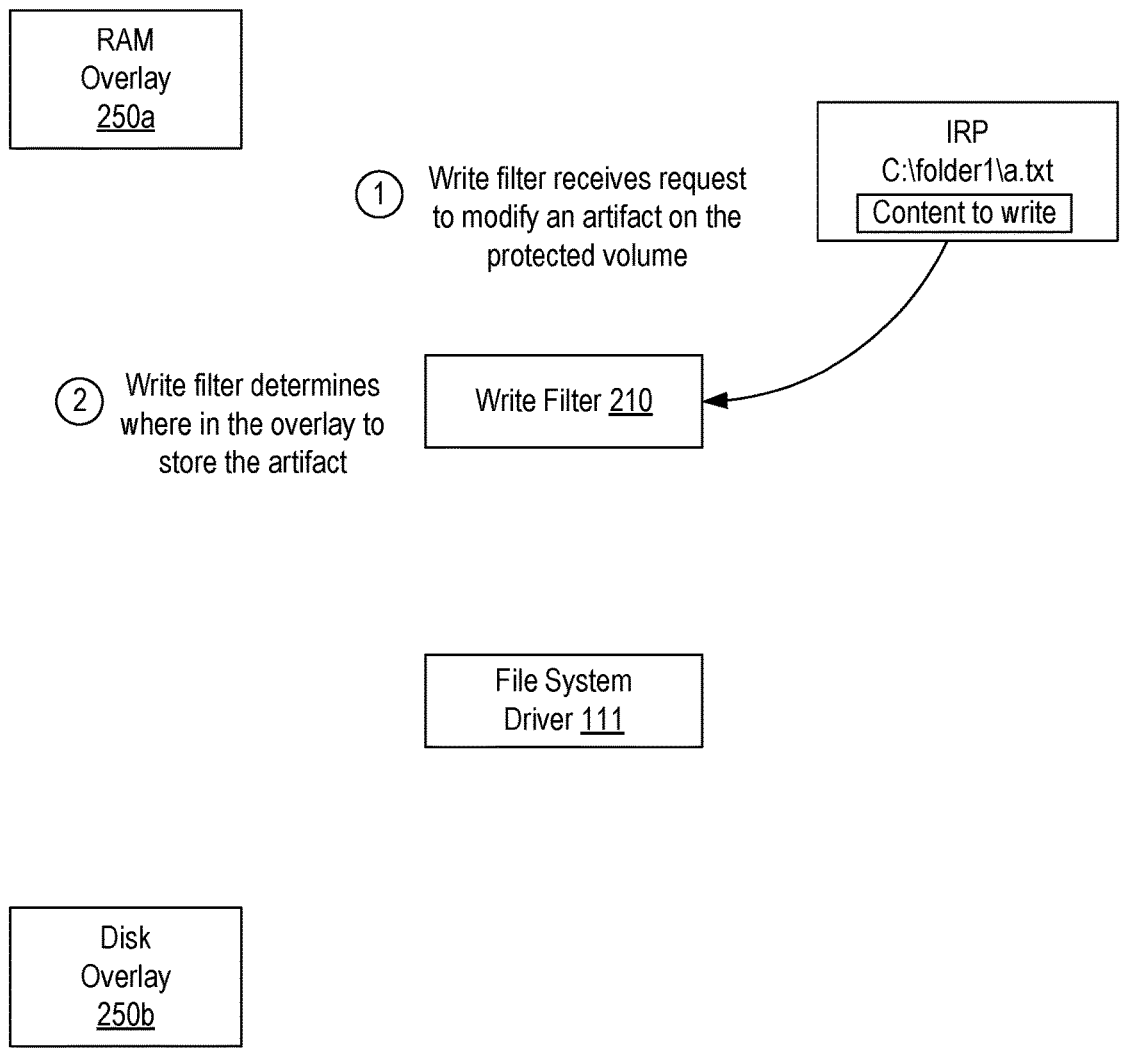
FIGS. 4A-4H illustrate an example of how the write filter of the present invention can process I/O requests.

In FIG. 4A, it is assumed that an application has issued a request to modify the artifact C:\folder1\a.txt. As a result, write filter 210 receives a corresponding IRP from I/O manager 120 in step 1. As is known, the IRP will identify the type of operation to be performed (which in this case is a write), the target of the request (which in this case is C:\folder1\a.txt), and the content to write, among other things. Because the IRP pertains to a modification to an artifact on a protected volume, and assuming an exclusion for this artifact has not been registered, write filter 210 will prevent the IRP from being passed down to file system driver 111 so that the modification will not be made on the protected volume.

In accordance with the techniques of the present invention, in step 2, write filter 210 can determine where in the overlay to store the artifact (or portion of the artifact) that is the target of the IRP. As mentioned above, this determination can be based on current utilization of resources such as how much space is available within RAM overlay portion 250*a*, how much total RAM is available, or a percentage of RAM that RAM overlay portion 250*a* is already consuming. In other words, write filter 210 can determine whether there is space in RAM overlay portion 250*a* to store the modified portions of the artifact and if not, whether the size of RAM overlay portion 250*a* could/should be increased to make space. Based on the assumption that RAM overlay portion 250*a* does not currently store any artifacts, the logic will likely dictate that the content of the IRP should be stored in RAM overlay portion 250*a*.

Figure 4B:
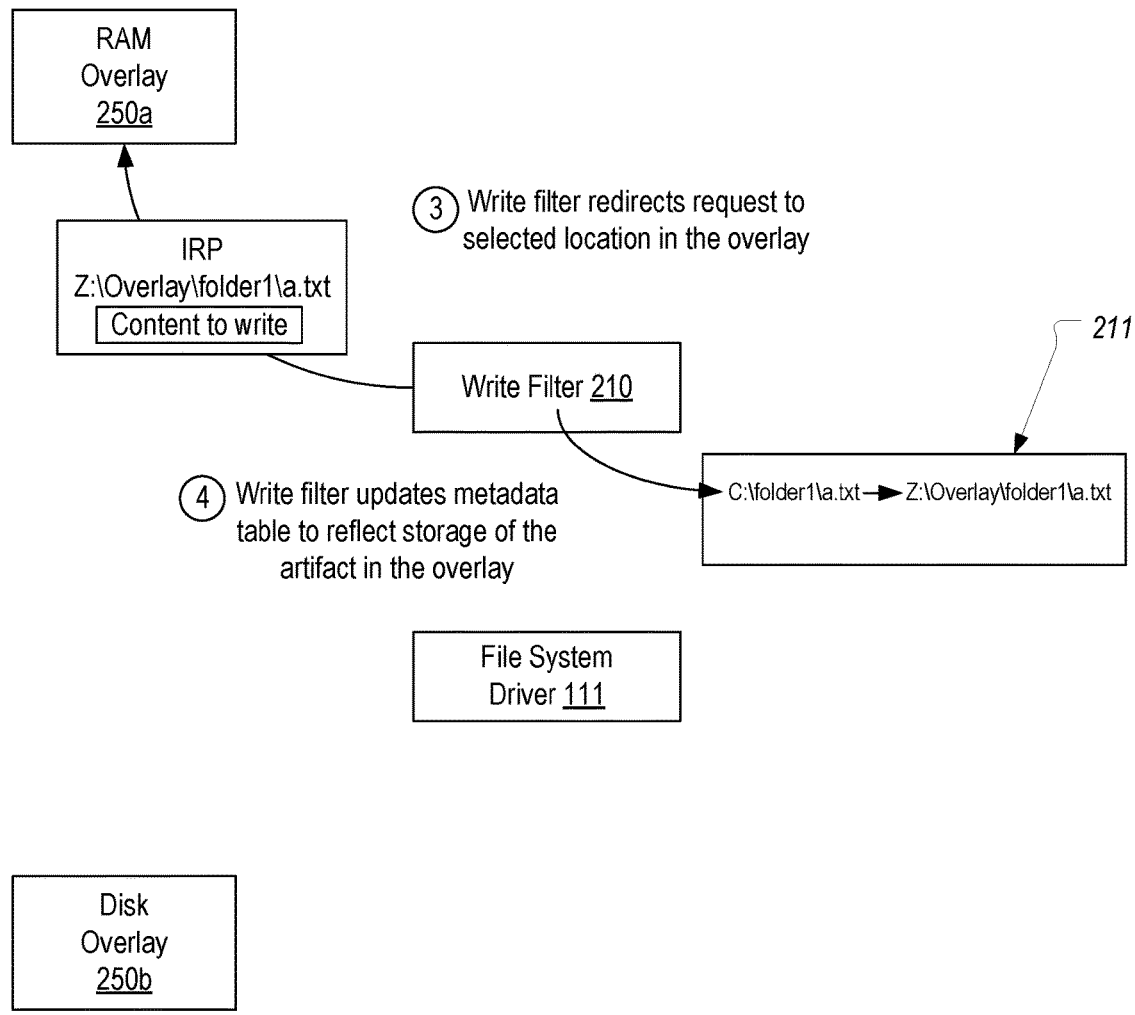
Figure 4C:
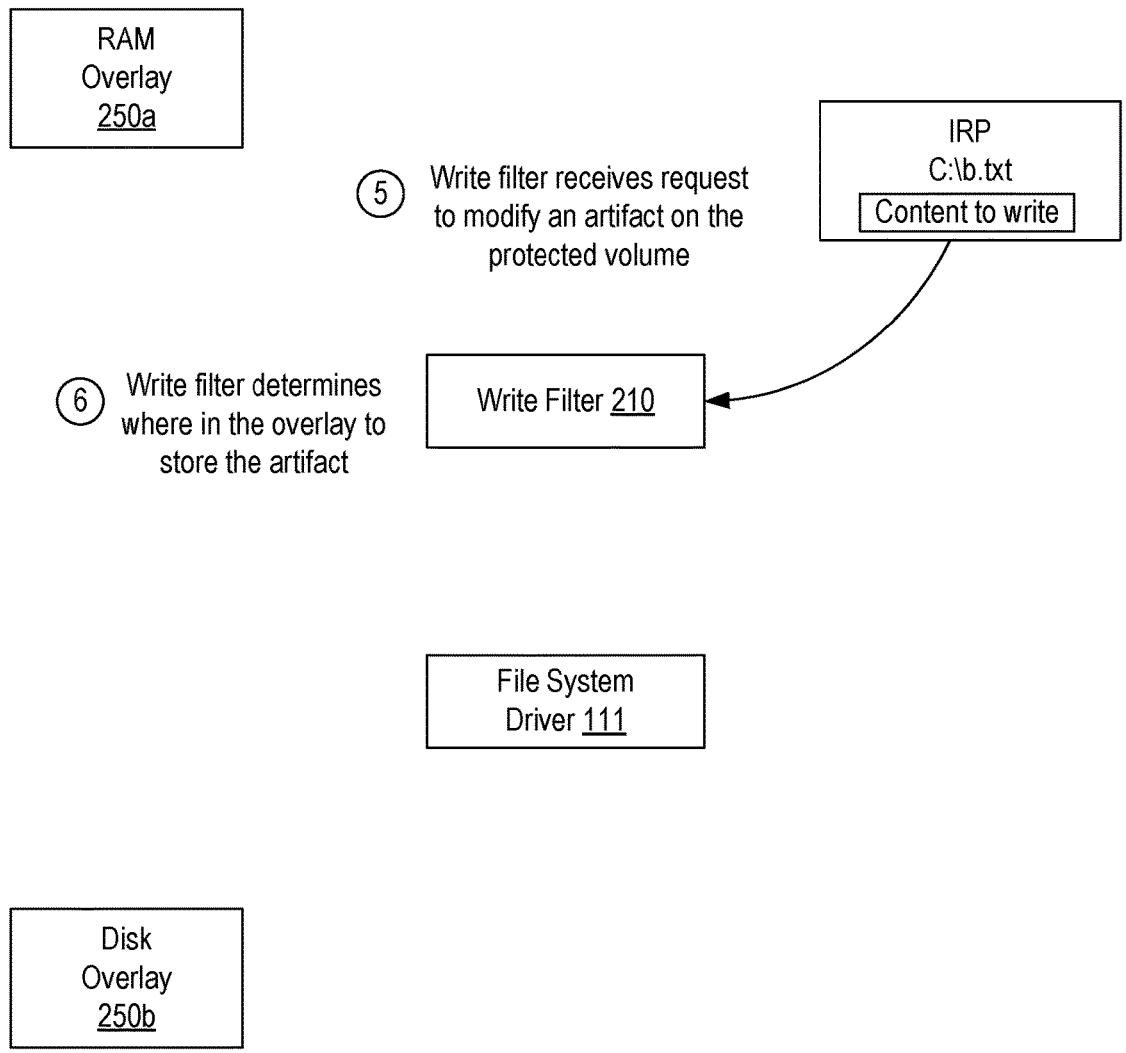
Figure 4D:
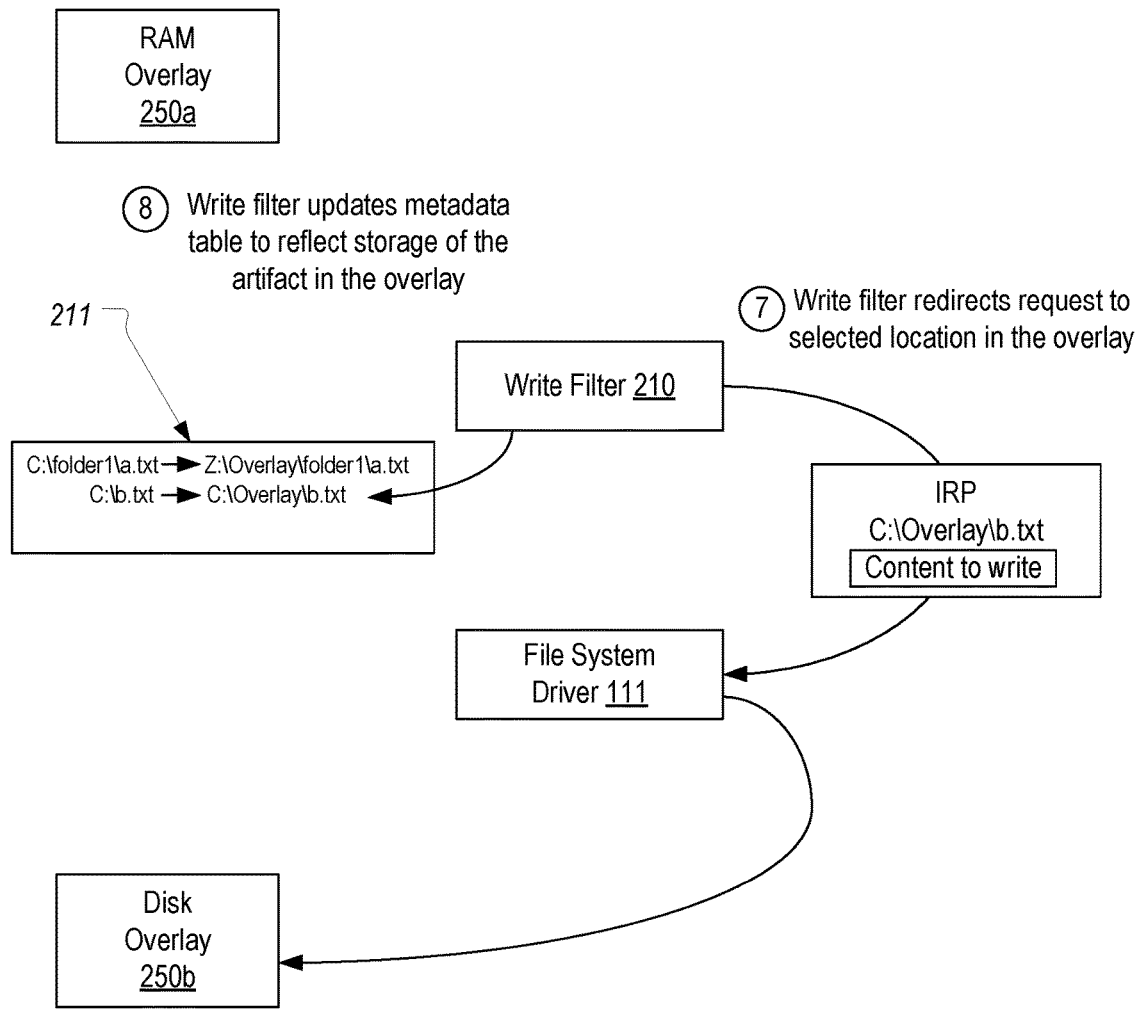

Accordingly, in step 3 shown in FIG. 4B, write filter 210 is shown as redirecting the write request to RAM overlay portion 250*a*. In general, this redirection results in an IRP being sent to the device stack (not shown) for RAM overlay portion 250*a* that specifies the file and content to write. Importantly, this IRP will cause the changed portions of the a.txt artifact (i.e., the content of the buffer in the original IRP) to be stored at the Z:\Overlay\folder1\ location in RAM overlay portion 250*a*. One way in which this may be accomplished is by extracting the contents of the buffer from the intercepted IRP and employing the ZwCreateFile and ZwWriteFile functions to write the contents of the buffer to RAM overlay portion 250*a*.

In step 3, it is assumed that C:\folder1\a.txt has not previously been stored in the overlay which could have been determined by failing to locate a corresponding entry in metadata table 211. However, if C:\folder1\a.txt (or more correctly an artifact representing C:\folder1\a.txt) had previously been stored in the overlay, this previously stored artifact would have been updated (e.g., by using ZwCreateFile or ZwOpenFile to open the artifact and then calling ZwWriteFile to update it with the contents of the buffer).

In any case, with the artifact stored (or updated) in RAM overlay portion 250*a* in accordance with the buffer contents of the intercepted IRP, write filter 210 can create (or possibly update) an entry in metadata table 211 to reflect that the artifact is now stored in RAM overlay portion 250*a*. For example, as shown in step 4, write filter 210 can add an entry that maps C:\folder1\a.txt to Z:\Overlay\folder1\a.txt. Although not shown, write filter 210 can include in the entry an indication of which portions of the artifact have been stored in the overlay. For example, if the buffer contents of the IRP only included updates to blocks 1-3 of the artifact and the artifact spans 10 blocks, the entry can define that Z:\Overlay\folder1\a.txt only includes blocks 1-3 of C:\folder1\a.txt. On the other hand, if the artifact was only 3 blocks in size, Z:\Overlay\folder1\a.txt would represent the entire artifact, and the entry could be configured to indicate this (e.g., by having a value of "No" in the Partial column).

At this point, metadata table 211 will define that the C:\folder1\a.txt artifact has been cached in RAM overlay

250*a* as Z:\Overlay\folder1\a.txt including identifying which portions of C:\folder1\a.txt are cached. In this state, if another write request targeting C:\folder1\a.txt is received, it can be redirected to RAM overlay 250*a* to cause Z:\Overlay\folder1\a.txt to be updated accordingly. If this update entailed modifications to previously unmodified portions of the artifact (e.g., modifications to blocks 4-6), the corresponding entry in metadata table 211 would be updated to reflect the addition of these modified portions to RAM overlay cache 250*a*. In short, at any given time, metadata table 211 will define which portions of which artifacts on the protected volume have been modified and therefore stored in the overlay as well as where in the overlay they are stored.

Next, it will be assumed that a number of additional I/O requests have been redirected causing a number of artifacts to be stored in RAM overlay portion 250*a* such that it has become relatively full. In this state, it will be assumed that an application issues a write request to C:\b.txt. As a result, in step 5 shown in FIG. 4C, write filter 210 will intercept the corresponding IRP. Because C:\b.txt is on the protected volume, write filter 210 will redirect the request. In step 6, write filter 210 can determine where to redirect this request. In this example, it will be assumed that write filter 210 determines that RAM overlay portion 250*a* has become "full" (e.g., by determining that there is insufficient free space in RAM overlay portion 250*a* to store the contents of the intercepted IRP or by determining that the amount of free space is below some threshold). In response, write filter 210 can determine whether the size of RAM overlay portion 250*a* can be increased (e.g., by determining how much RAM is currently available), and if so, increase its size to allow the request to be redirected to RAM overlay portion 250*a*. On the other hand, if write filter 210 determines that there is no space for RAM overlay portion 250*a* to grow, write filter 210 can instead redirect the request to disk overlay portion 250*b*. In this way, the overlay will effectively grow on disk rather than in RAM.

For purposes of this example, it will be assumed that write filter 210 determines that RAM overlay portion 250*a* cannot grow and therefore, in step 7, write filter 210 redirects the request to disk overlay portion 250*b*. As shown, this may be accomplished by passing an IRP down to file system driver 111. Importantly, this IRP will target disk overlay portion 250*b* (e.g., by writing to C:\Overlay\b.txt rather than to the original version of the artifact at C:\b.txt). Write filter 210 could either modify the intercepted IRP to target the appropriate location in disk overlay portion 250*b* or create a new IRP that targets this location and includes the buffer contents from the intercepted IRP. In either case, the result will be that the buffer contents of the intercepted IRP (i.e., the modified portions of C:\b.txt) will be stored in disk overlay portion 250*b*. In step 8, write filter 210 will update metadata table 211 to reflect that the modifications to C:\b.txt have been cached in C:\Overlay\b.txt. Although not depicted in FIG. 4D, the entry in metadata table 211 can include information defining which portions of the artifact are stored in disk overlay portion 250*b* and possibly identify whether these portions represent the entire artifact.

To summarize, write filter 210 can dynamically determine whether to redirect a request to a RAM overlay portion or to a disk overlay portion based on available resources. In this way, write filter 210 can allow the overall size of the overlay to expand as necessary without consuming excessive amounts of RAM. Assuming that sufficient disk space exists, the overlay can continue to grow indefinitely thereby minimizing or eliminating the occurrence of forced reboots.

Figure 4E:
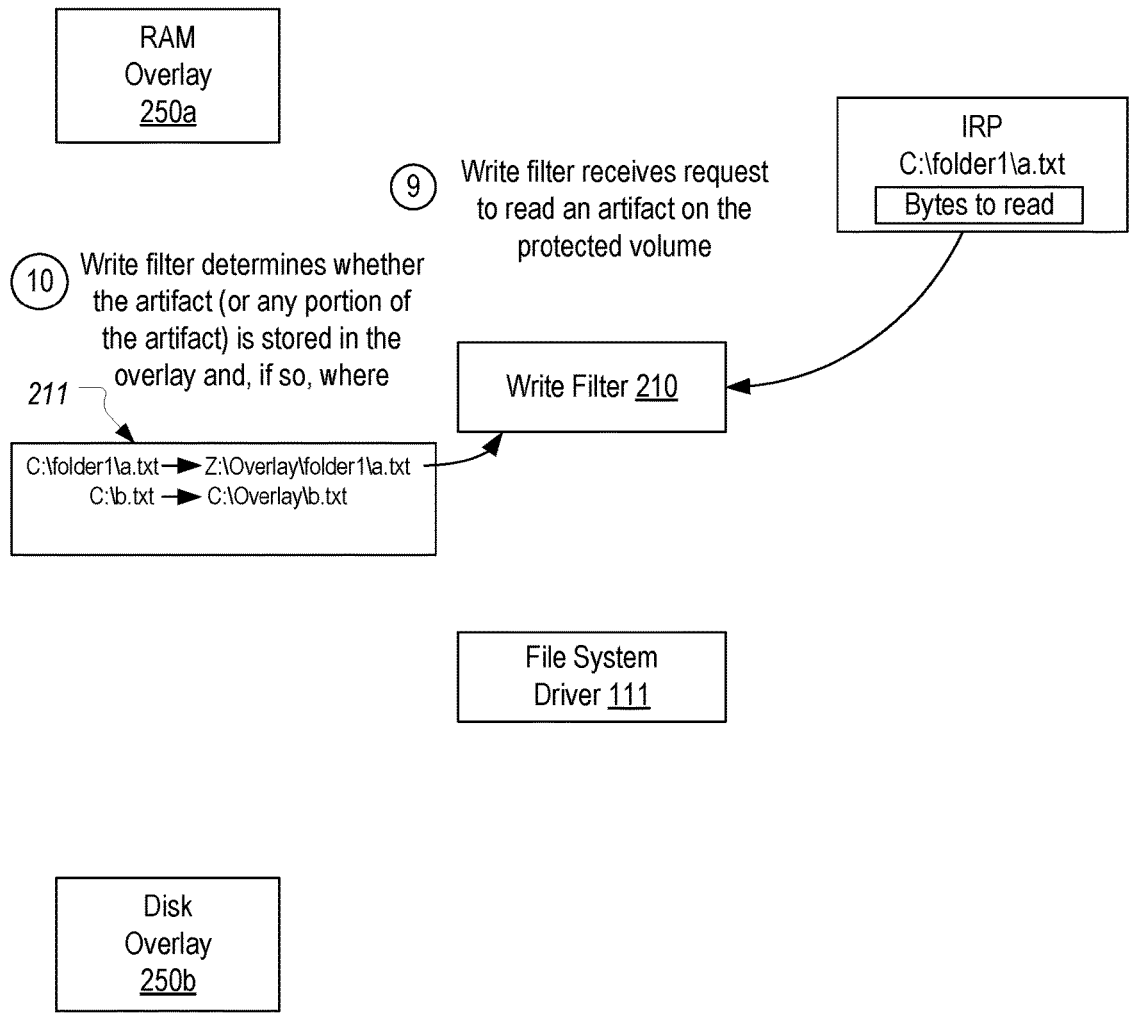
Figure 4F:
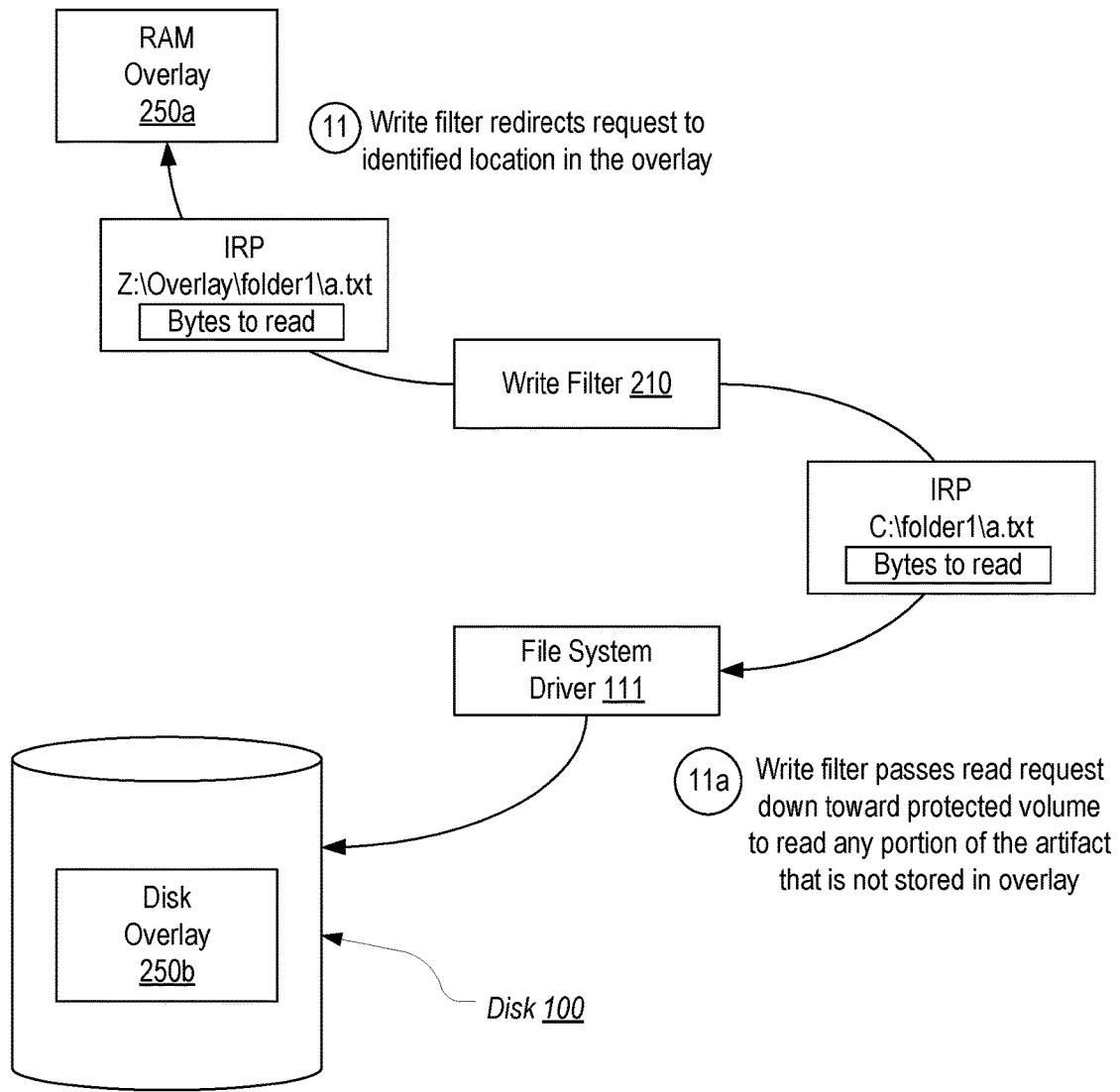
Figure 4G:
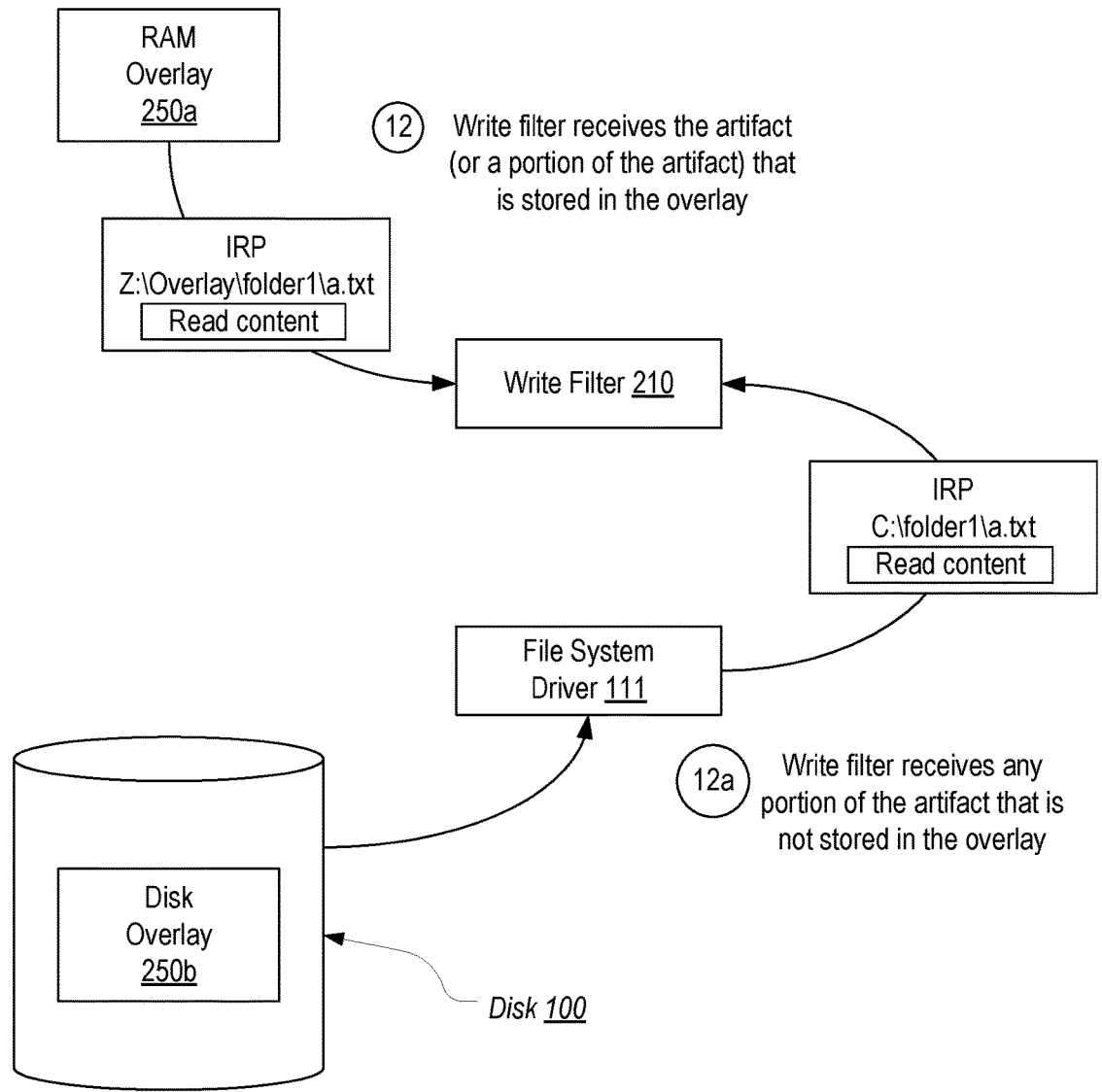
Figure 4H:
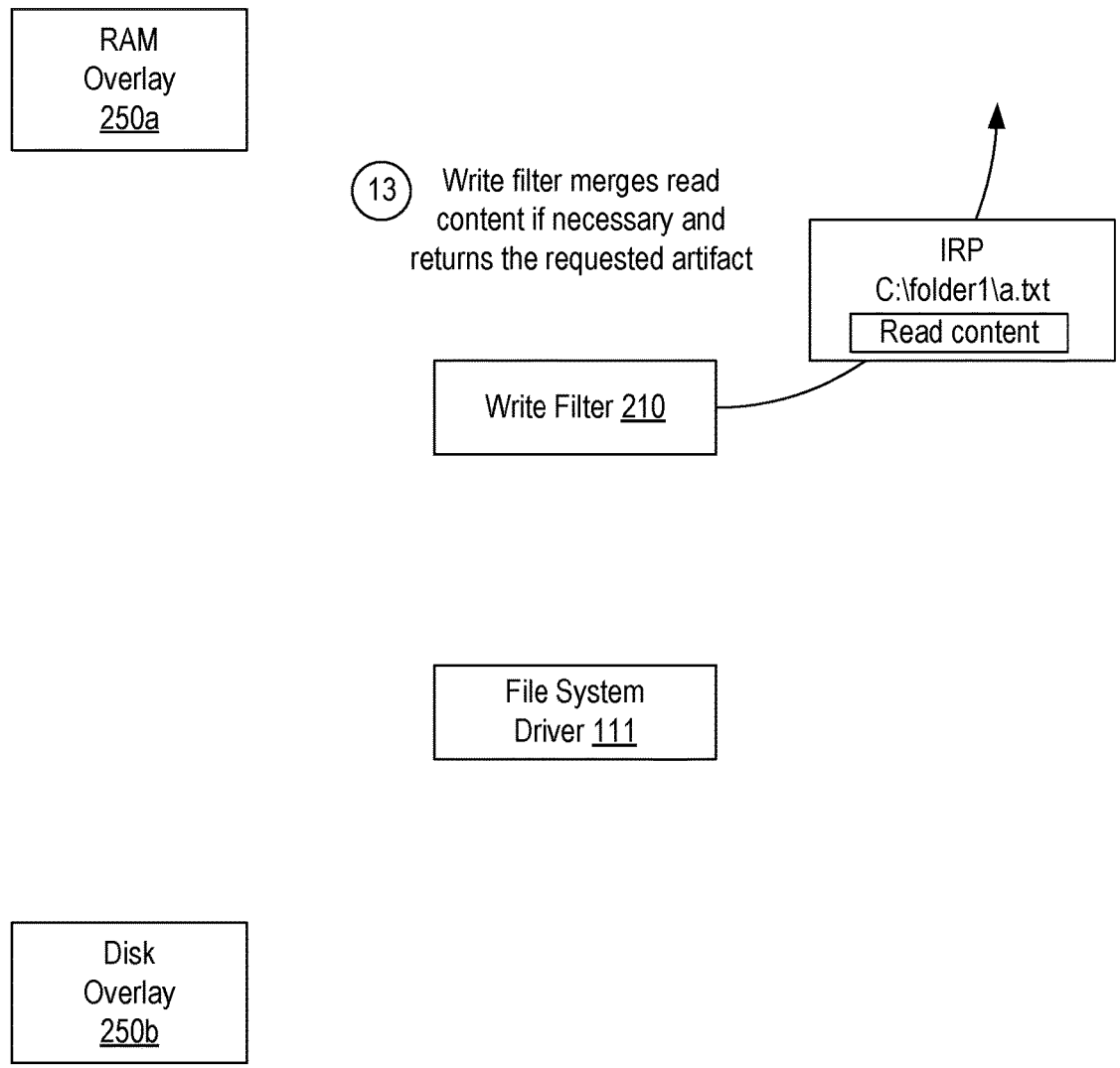

Once modified portions of an artifact have been stored in the overlay, write filter 210 can employ metadata table 211 when processing a request to read the artifact to ensure that the modified version of the artifact will be returned to the requesting application. For example, in step 9 shown in FIG. 4E, write filter 210 is shown as intercepting a request to read C:\folder1\a.txt. As is known, a read request can specify how much of a targeted artifact should be read which is represented in FIG. 4E as "Bytes to read."

Upon receiving this read request, write filter 210 can identify the target of the read request and determine whether an entry for the target exists in metadata table 211. As shown in step 10, write filter 210 will locate the entry for C:\folder1\a.txt in metadata table 211 and determine that this artifact has been cached in RAM overlay portion 250*a* at Z:\Overlay\folder1\a.txt. Although not shown, write filter 210 can also identify from the entry which portions of C:\folder1\a.txt are cached. For this example, it will be assumed that blocks 1-3 have been cached and that the artifact is 10 blocks in size (i.e., blocks 4-10 have not been changed). It will also be assumed that the read request specifies that the entire file should be read.

Based on this information in metadata table 211, write filter 210 can determine that two read requests need to be generated: one request to read blocks 1-3 from RAM overlay portion 250*a* and one request to read blocks 4-10 from the protected volume. In contrast, if all of the content requested in the intercepted IRP was stored in RAM overlay 250*a* (or any other portion of the overlay), write filter 210 would be able to complete the request by redirecting it to RAM overlay 250*a*. This would be the case if the read requested only modified portions of the artifact or if the entire artifact had been modified (e.g., overwritten) and therefore stored in the overlay.

Assuming again that the read requests portions of C:\folder1\a.txt that are stored in RAM overlay portion 250*a* and portions that are stored on the protected volume, write filter 210 will send a read request to RAM overlay portion 250*a* in step 11 and a read request to the protected volume in step 11*a*. The read request can be sent to RAM overlay portion 250*a* by calling the ZwReadFile function for Z:\Overlay\folder1\a.txt and specifying the requested portions of the artifact that were stored in RAM overlay 250*a* (as indicated by metadata table 211). In this case, this read request can specify blocks 1-3 of Z:\Overlay\folder1\a.txt. Similarly, the read request can be sent to the protected volume by either modifying the intercepted IRP appropriately (e.g., specifying that only blocks 4-10 should be read) and passing the modified IRP down to file system driver 111 or by creating a new IRP (e.g., by calling ZwReadFile for C:\folder1\a.txt and specifying blocks 4-10).

The two read requests will be processed causing the IRPs to be updated with the read content. Write filter 210 will then be notified of the completion of the reads in steps 12 and 12*a*. Finally, in step 13, write filter 210 can merge the two reads and return the read contents to the requesting application (e.g., by storing the read content received from RAM overlay portion 250*a* and the protected volume in the buffer of the intercepted IRP and then completing the IRP). Due to the processing performed by write filter 210, it will appear to the requesting application as if the artifact stored on the protected volume had been modified when in fact these modifications were only temporarily stored in the overlay.

Figure 5A:
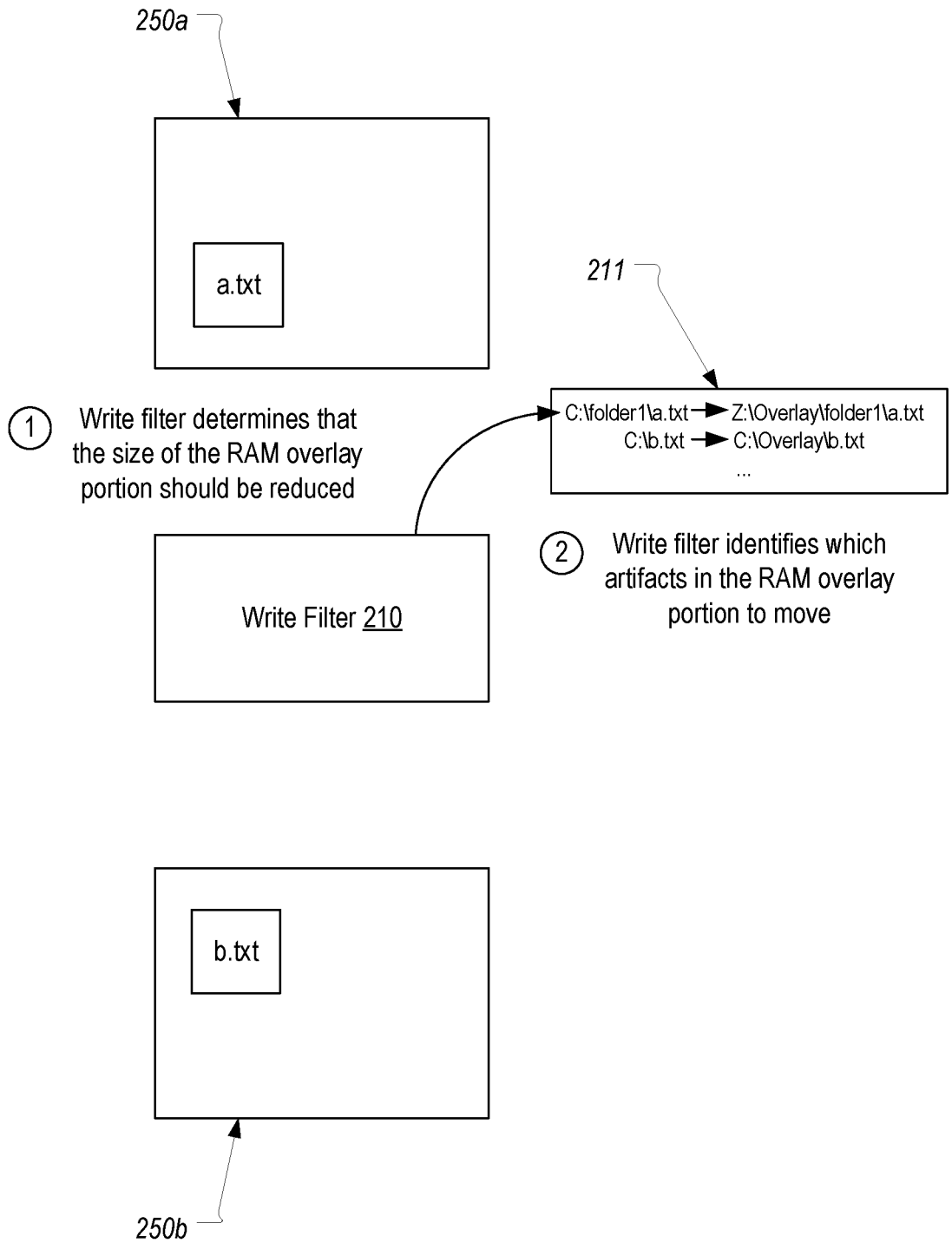
FIGS. 5A-5C illustrate how the write filter of the present invention can move modified artifacts from one overlay portion to another overlay portion.
Figure 5B:
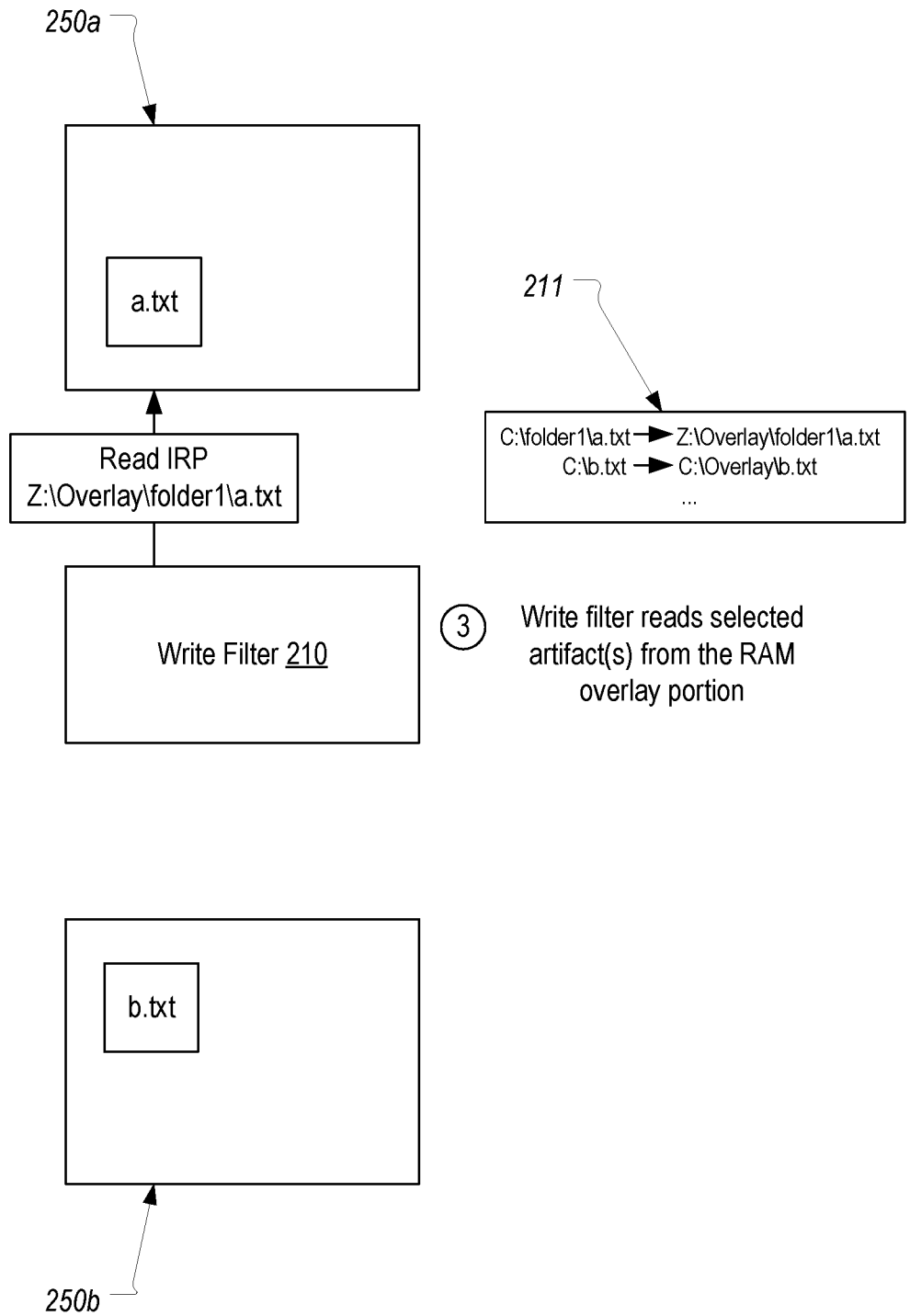
Figure 5C:
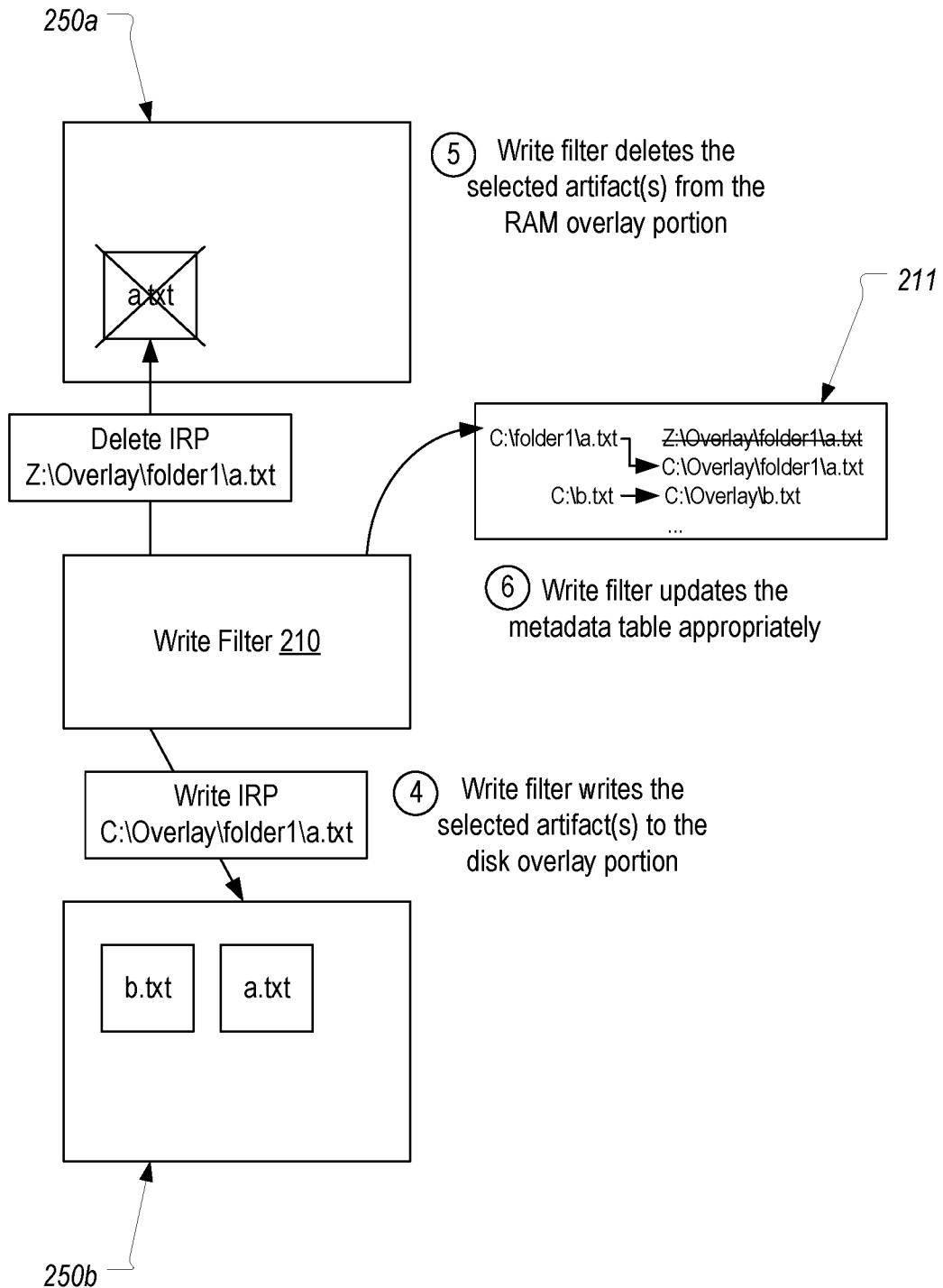

In some embodiments, write filter 210 may be configured to dynamically shrink the size of RAM overlay portion 250*a* or to otherwise free up space within RAM overlay portion 250*a*. One reason for doing so may be to increase the amount of RAM that may be available for use by other processes. To shrink RAM overlay portion 250a, write filter 210 can move artifacts that are stored in RAM overlay portion 250a to disk overlay portion 250b. FIGS. 5A-5C depict this process.

In step 1 shown in FIG. 5A, write filter 210 determines that the size of RAM overlay portion 250a should be reduced. This determination could be based on a number of factors such as the percentage of RAM that is currently being used or a percentage of RAM that RAM overlay portion 250a occupies.

In step 2, write filter 210 can access metadata table 211 to identify one or more artifacts that are available to be moved. Although not shown, various different criteria could be employed to identify which artifacts to move from RAM overlay portion 250a. As an example, write filter 210 may maintain record of when an artifact was last accessed and may select artifacts that were least recently accessed to be moved. Write filter 210 may also take into account the size of the artifact and prioritize moving larger artifacts. Write filter 210 may also maintain a record of which application and/or user created and/or accessed the artifact and retain artifacts that were created or accessed by selected applications and/or users. Write filter 210 may also prioritize retaining artifacts that are stored in a particular location on the protected volume or certain types of artifacts (e.g., by retaining system files in RAM overlay portion 250a). In any case, in step 2, it will be assumed that write filter 210 selects C:\folder1\a.txt to move.

In step 3 in FIG. 5B, write filter 210 issues a request (e.g., by calling ZwReadFile) to read Z:\Overlay\folder1\a.txt (based on the mapping of C:\folder1\a.txt to Z:\Overlay\folder1\a.txt in metadata table 211) which will result in the modified portions of C:\folder1\a.txt being stored in the buffer of the IRP. Then, in step 4, write filter 210 can extract the buffer contents and issue a request to write the contents to disk overlay portion 250b (e.g., by calling ZwCreateFile and ZwWriteFile). For example, in FIG. 5C, the modified portions of C:\folder1\a.txt are shown as being stored at C:\Overlay\folder1\a.txt.

With the artifact now stored in disk overlay portion 250b, write filter 210 can issue a request to delete the artifact from RAM overlay portion 250a in step 5 (e.g., by calling ZwDeleteFile). At this point, if it was desired to shrink RAM overlay portion 250a, write filter 210 could take the necessary steps to do so now that the space previously occupied by Z:\Overlay\folder1\a.txt has been freed. Finally, in step 6, write filter 210 can update metadata table 211 to reflect that the artifact has been moved. For example, in FIG. 5C, metadata table 211 is updated to map C:\folder1\a.txt to C:\Overlay\folder1\a.txt.

FIGS. 5A-5C depict an example where the entirety of an artifact is moved from RAM overlay portion 250a. However, in some embodiments, only a portion of the artifact may be moved such that portions of the artifact will be stored in both RAM overlay portion 250a and disk overlay portion 250b. For example, if a rather large artifact is stored in RAM overlay portion 250a (which may often be the case when a file is overwritten or a new file is added) but only a few blocks of the artifact are being accessed, write filter 210 may move the blocks of the artifact that have not been accessed recently to disk overlay portion 250b and retain the blocks that have been accessed recently. In this way, the frequently accessed blocks will remain in RAM where they can be accessed more quickly. In this scenario, write filter 210 can update metadata table 211 to include multiple entries for the same artifact. For example, if some portions of C:\b.txt were stored in RAM overlay portion 250a and other portions were stored in disk overlay portion 250b, metadata table 211 may include an entry mapping C:\b.txt to Z:\Overlay\b.txt and an entry mapping C:\b.txt to C:\Overlay\b.txt. Each entry would also include an identification of the portions of the C:\b.txt artifact that are stored at the corresponding location. In this scenario, and with reference to the processing of a read request shown in FIGS. 4E-4H, it may be necessary to direct the read request to three separate locations—RAM overlay portion 250a, disk overlay portion 250b, and the protected volume (assuming that portions of the artifact had not been changed).

Write filter 210 may also perform a reverse process if it is determined that an artifact stored in disk overlay portion 250b is being accessed relatively frequently in comparison to artifacts stored in RAM overlay portion 250a. In this manner, write filter 210 can increase the efficiency of providing a protected volume.

Figure 6:
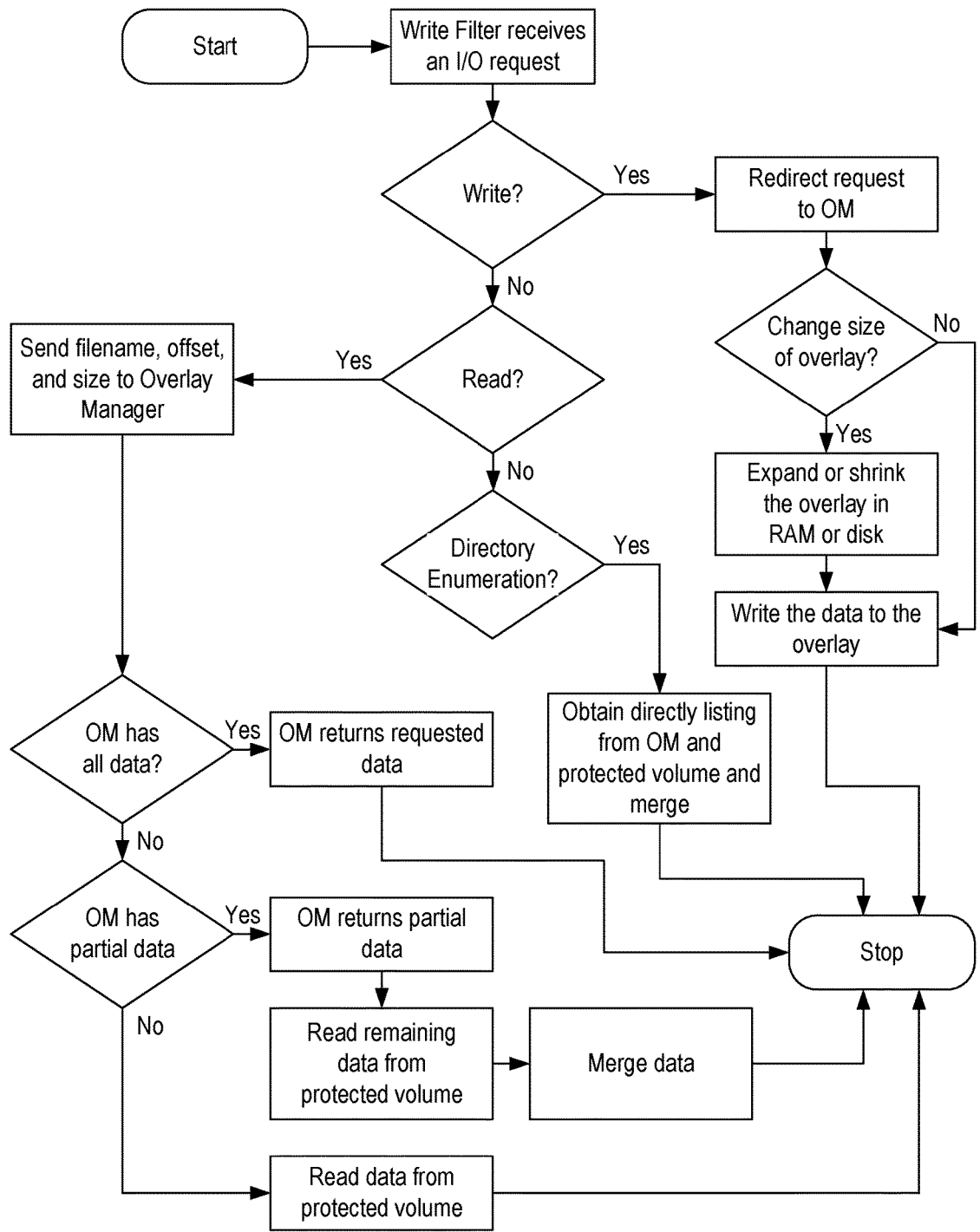
FIG. 6 illustrates a flow diagram representing the processing that the write filter can perform when an I/O request is received.

FIG. 6 provides a flow diagram that summarizes the processing that write filter 210 can perform. Unlike in the above description, FIG. 6 partially distinguishes between functions that the filter driver portion of write filter 210 performs and functions that overlay manager 210a performs. Whenever write filter 210 receives an I/O request, it can first determine what type of request it is. If the request is a write request, it can be redirected to overlay manager 210a. As mentioned above, this can be accomplished by calling a write function of an internal API that passes the buffer contents of the I/O request to Overlay Manager 210a.

When Overlay Manager 210a receives a write request, it can determine whether the size of the overlay should be changed. For example, Overlay Manager 210a may determine whether there is sufficient space in RAM overlay portion 250a and if not whether RAM overlay portion 250a can/should be expanded. Alternatively, Overlay Manager 210a may determine whether there is sufficient space in disk overlay portion 250b and, if not, expand disk overlay portion 250b to make space. Overlay Manager 210a may also consider system resource utilization in these determinations. Overlay Manager 210a may further consider whether currently stored artifacts could be moved to make room for the write and/or based on system resource utilization.

In any case, whether or not the size of the overlay is modified or whether any other artifacts are moved, Overlay Manager 210a can write the data, update metadata table 211 appropriately, and notify write filter 210 to complete the I/O request.

In the case of a read, write filter 210 can pass the filename, offset, and size of the read to Overlay Manager 210a (e.g., by calling a read function of an internal API). Based on metadata table 211, Overlay Manager 210a can determine whether it has all of the requested data and, if so, return it to write filter 210 which will complete the read request with the data. In contrast, if Overlay Manager 210a does not have all of the requested data, it can return the portions of the requested data that it has (i.e., the portions of the requested data that are stored in the overlay) to write filter 210 which can then read the remaining portions of the requested data from the protected volume and then complete the I/O request with the merged data. If Overlay Manager 210a does not have any of the requested data, write filter 210 can simply pass the request down the stack to allow it to be read from the protected volume in a typical manner.

Finally, in the case of a directory enumeration, write filter 210 can request a directory listing from both Overlay Manager 210a and the protected volume and merge them. The directory listing received from Overlay Manager 210a would be based on metadata table 211 which may include entries for new artifacts that have been created, duplicate entries representing modified artifacts, and even entries representing deleted artifacts. The merging process would take such entries into account so that the response would represent all modifications that had been captured in the overlay.

In summary, the write filter of the present invention can provide a dynamically expandable overlay for storing modified artifacts of a protected volume. The overlay can be dynamically expanded both in RAM and on disk to thereby allow the size of the overlay to be relatively large. As a result, it is unlikely that the overlay will become full and force a reboot.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a write filter, for implementing an overlay, the method comprising:
    maintaining, by the write filter, an overlay for a protected volume, the overlay being split between a RAM overlay portion and a disk overlay portion;
    receiving, by the write filter, a first I/O request that modifies a first artifact stored on the protected volume;
    in response to receiving the first I/O request, performing a first evaluation of a size of the RAM overlay portion;
    based on the first evaluation, redirecting, by the write filter, the first I/O request to the RAM overlay portion rather than to the disk overlay portion by storing the modified first artifact in the RAM overlay portion and by preventing the first I/O request from modifying the first artifact on the protected volume;
    receiving, by the write filter, a second I/O request that modifies a second artifact stored on the protected volume;
    in response to receiving the second I/O request, performing a second evaluation of the size of the RAM overlay portion; and
    based on the second evaluation, redirecting, by the write filter, the second I/O request to the disk overlay portion rather than to the RAM overlay portion by storing the modified second artifact in the disk overlay portion and by preventing the second I/O request from modifying the second artifact on the protected volume.

2. The method of claim 1, wherein the second evaluation comprises evaluating a percentage of RAM that is being used.

3. The method of claim 1, wherein the second evaluation comprises evaluating a percentage of RAM that is being used by the RAM overlay portion.

4. The method of claim 1, wherein the second evaluation comprises determining that the size of the RAM overlay portion is insufficient to store the modified second artifact.

5. The method of claim 4, wherein the second evaluation further comprises determining that there is insufficient RAM available to expand the RAM overlay portion.

6. The method of claim 1, further comprising:
    receiving a third I/O request that modifies a third artifact stored on the protected volume;
    in response to receiving the third I/O request, performing a third evaluation of the size of the RAM overlay portion;
    based on the third evaluation, expanding the RAM overlay portion; and
    after expanding the RAM overlay portion, redirecting the third I/O request to the RAM overlay portion by storing the modified third artifact in the RAM overlay portion.

7. The method of claim 6, wherein the third evaluation comprises determining that sufficient RAM is available to expand the RAM overlay portion.

8. The method of claim 1, further comprising:
    updating a metadata table to identify where the modified first and second artifacts are stored in the overlay.

9. The method of claim 8, wherein the modified second artifact comprises a portion of the second artifact on the protected volume, and wherein the metadata table is also updated to identify which portion of the second artifact is stored in the overlay.

10. The method of claim 1, further comprising:
    moving the modified first artifact that has been stored in the RAM overlay portion to the disk overlay portion.

11. The method of claim 10, further comprising:
shrinking the RAM overlay portion after moving the modified first artifact to the disk overlay portion.

12. The method of claim 1, wherein the modified second artifact comprises a portion of the second artifact on the protected volume, the method further comprising:
receiving an I/O request to read the second artifact on the protected volume;
reading the portion of the second artifact that is stored in the disk overlay portion;
reading an additional portion of the second artifact on the protected volume; and
merging the portion and the additional portion into a response to the I/O request.

13. One or more computer storage media storing computer-executable instructions which when executed implement a write filter that is configured to:
maintain an overlay for a protected volume, the overlay being split between a RAM overlay portion and a disk overlay portion;
receive a first I/O request that modifies a first artifact stored on the protected volume;
in response to receiving the first I/O request, perform a first evaluation of a size of the RAM overlay portion;
based on the first evaluation, redirect the first I/O request to the RAM overlay portion rather than to the disk overlay portion by storing the modified first artifact in the RAM overlay portion and by preventing the first I/O request from modifying the first artifact on the protected volume;
receive a second I/O request that modifies a second artifact stored on the protected volume;
in response to receiving the second I/O request, perform a second evaluation of the size of the RAM overlay portion, and
based on the second evaluation, redirect the second I/O request to the disk overlay portion rather than to the RAM overlay portion by storing the modified second artifact in the disk overlay portion and by preventing the second I/O request from modifying the second artifact on the protected volume.

14. The computer storage media of claim 13, wherein the second evaluation comprises one or both of:
evaluating a percentage of RAM that is being used; or
evaluating a percentage of RAM that is being used by the RAM overlay portion.

15. The computer storage media of claim 13, wherein the second evaluation comprises determining that the size of the RAM overlay portion is insufficient to store the modified second artifact.

16. The computer storage media of claim 15, wherein the second evaluation further comprises determining that there is insufficient RAM available to expand the RAM overlay portion.

17. The computer storage media of claim 13, wherein the write filter is further configured to:
determine how frequently the modified first artifact is accessed; and
in response to the determination, move the modified first artifact from the RAM overlay portion to the disk overlay portion.

18. A method, implemented by a write filter, for implementing an overlay comprising:
maintaining, by the write filter, an overlay for a protected volume, the overlay being split between a RAM overlay portion and a disk overlay portion;
receiving, by the write filter, a first I/O request that modifies a first artifact stored on the protected volume;
in response to receiving the first I/O request, performing a first evaluation of a size of the RAM overlay portion;
based on the first evaluation, redirecting, by the write filter, the first I/O request to the RAM overlay portion rather than to the disk overlay portion by storing the modified first artifact in the RAM overlay portion and by preventing the first I/O request from modifying the first artifact on the protected volume;
receiving, by the write filter, a second I/O request that modifies a second artifact stored on the protected volume;
in response to receiving the second I/O request, performing a second evaluation of the size of the RAM overlay portion;
based on the second evaluation, redirecting, by the write filter, the second I/O request to the disk overlay portion rather than to the RAM overlay portion by storing the modified second artifact in the disk overlay portion and by preventing the second I/O request from modifying the second artifact on the protected volume;
determining, by the write filter, that the size of the RAM overlay portion should be reduced;
in response to the determination, identifying the modified first artifact that is stored in the RAM overlay portion;
storing the modified first artifact in the disk overlay portion and deleting the modified first artifact from the RAM overlay portion; and
after deleting the modified first artifact from the RAM overlay portion, reducing the size of the RAM overlay portion.

19. The method of claim 18, further comprising:
maintaining a metadata table that identifies where modified artifacts are stored in the overlay, including adding an entry to the metadata table that identifies that the modified second artifact is stored in the disk overlay portion.

20. The method of claim 18, wherein determining that the size of the RAM overlay portion should be reduced comprises determining that a percentage of RAM that the RAM overlay portion consumes exceeds a threshold.

* * * * *